United States Patent
Govindarajulu et al.

(10) Patent No.: US 10,042,840 B2
(45) Date of Patent: Aug. 7, 2018

(54) HYBRID GRAMMATICAL AND UNGRAMMATICAL PARSING

(71) Applicant: Yahoo Holdings, Inc., Sunnyvale, CA (US)

(72) Inventors: Naveen Sundar Govindarajulu, San Jose, CA (US); Nicholas L. Cassimatis, Sunnyvale, CA (US); Jonathan R. Scally, Arlington, VA (US)

(73) Assignee: OATH INC., New York ( * ) Notice: Subject to any disclaimer, the term of this patent is extended or adjusted under 35 U.S.C. 154(b) by 42 days.

(21) Appl. No.: 15/228,610

(22) Filed: Aug. 4, 2016

(65) Prior Publication Data

US 2018/0039614 A1    Feb. 8, 2018

(51) Int. Cl.
| | | |
|---|---|---|
| G06F 17/27 | (2006.01) | |
| G06F 17/28 | (2006.01) | |
| G10L 15/18 | (2013.01) | |

(52) U.S. Cl.
CPC ........ *G06F 17/271* (2013.01); *G06F 17/2785* (2013.01)

(58) Field of Classification Search
CPC .......... G06F 17/2785; G06F 17/30684; G06F 17/274; G06F 17/271; G06F 17/2765
USPC .......... 704/9, 2, 257, 4, 8, E15.022; 706/11; 707/E17.068, 723; 715/256
See application file for complete search history.

(56) References Cited

U.S. PATENT DOCUMENTS

| | | | |
|---|---|---|---|
| 5,727,222 A | | 3/1998 | Maxwell, III |
| 5,963,894 A | * | 10/1999 | Richardson ........... G10L 15/193 704/2 |
| 7,027,974 B1 | | 4/2006 | Busch et al. |
| 8,818,795 B1 | | 8/2014 | Cassimatis et al. |
| 2017/0024375 A1 | * | 1/2017 | Hakkani-Tur ...... G06F 17/2785 |

OTHER PUBLICATIONS

Bignoli, Perrin G. "Human-Level Natural Language Understanding: False progress and Real Challenges." Doctoral Dissertation, Department of Cognitive Science, Rensselaer Polytechnic Institute; 427 pgs., 2013.
De Marneffe, Marie-Catherine, Bill MacCartney, and Christopher D. Manning. "Generating Typed Dependency Parses from Phrase Structure parses." *Proceedings of LREC.* vol. 6. No. 2006. 6pgs., 2006.
Manzano, MarÃa. *Extensions of First-order Logic.* vol. 19. Carnbridge University Press, 207 pgs., 1996.
Martin, James H., and Daniel Jurafsky. "Speech and Language Processing." *International Edition*, 975pgs., 2000.
McCord, Michael C. *Slot Grammar.* Springer Berlin Heidelberg, 28pgs., 1990.

(Continued)

*Primary Examiner* — Charlotte M Baker
(74) *Attorney, Agent, or Firm* — Cooper Legal Group, LLC

(57) ABSTRACT

A system and method for processing a natural language input. The natural language input is initially processed through a strict parser, which results in an initial parse. The initial parse is evaluated to determine if it exceeds a completeness threshold. If the initial parse does not pass the completeness threshold, any open slots are filled using type based slot filling. The final parse is then output for further processing by another system, such as a search engine.

20 Claims, 4 Drawing Sheets

(56) References Cited

OTHER PUBLICATIONS

Ranta, Aarne. *Grammatical Framework: Programming with Multilingual Grammars*. CSLI Publications, Center for the Study of Language and Information, 173 pgs., 2011.
Shieber, Stuart M. *An Introduction to Unification-Based Approaches to Grammar*. Microtome Publishing, 97 pgs., 2003.
Grammatical Framework: http://www.grammaticalframework.org. 4pgs downloaded Jun. 9, 2017.
Wolfram Alpha: http://blog.stephenwollram.com/2012/04/overcoming-artificial-stupidity/. 10pgs., downloaded May 25, 2017.

* cited by examiner

HYBRID GRAMMATICAL AND UNGRAMMATICAL PARSING

BACKGROUND

1. Technical Field Text

The disclosed embodiments are related to search technology and more particularly to natural language processing.

2. Background Information

Traditionally, computer programs have used a structured language for input. For example, a conventional search engine may parse Boolean-style syntax, such as may be used in a search query. For example, the search query "college OR university" may return results with "college," results with "university," or results with both, while the search query "college XOR university" may return results with "college" or results with "university," but not results with both.

More recently, there has been an effort to develop systems for natural language processing (NLP) to allow input using a natural language. As natural language systems become ubiquitous, users of such systems expect a progressively higher quality in their conversational interfaces. Because users utilize these systems for real time information retrieval, there is also a significant performance requirement, particularly for systems deployed at web scale.

Most current NLP solutions are therefore implemented with machine learning techniques, which are run over large corpora of training data sets, both for general queries, as well as domain specific queries. (If domain specific corpora are used, categorizers can be trained to first detect the domain of the query, and then interpret the query based on the domain.) This creates two specific problems. First, adding natural language solutions to a particular domain requires a large data science team, with access to large sets of historical queries. This makes NLP interfaces very exclusive, provided by providers with such data teams, and provided only for domains with large corpora.

Current natural language processing techniques require large amounts of data and human effort to learn a new grammar for a new domain. One way around this problem is to specify an abstract grammar M, called the model, in an easy to use language. Abstractly, the model M contains mapping from linguistic primitives and constructs to multi-sorted first order logic formulae. The logi formulae represent the semantics (meaning) of the linguistic primitives and constructs. More concretely, M may be conceptualized as containing mappings from words and phrases to semantic objects. A semantic object is a finite set of key and value pairs. The values have types (or categories or classes) similar to how values in typed programming languages like Java have types or classes. A semantic object can be thought of as a typed object with a list of fields which are also typed. Continuing the analogy with Java further, a model file may be conceptualized as defining mappings from words and phrases to class definitions.

When processing an individual sentence or utterance, the individual utterances instantiate specific objects based on the templates or class definitions defined in the model file. Note that while the model file has only a small finite set of definitions, the model defines mappings for an infinite number of sentences through compositionality (combining correctly simpler words and sentences to form longer sentences). This model M can be used in two ways.

In a first approach, the model M may be used to build a Strict Parser. The model M is converted to a natural language grammar G using existing constructs as a library. For example, if the grammar G is a context free grammar, we can use parsing techniques such as CYK (Cocke-Younger-Kasami algorithm) to parse input sentences. The parser constructed using this approach may parse very complex, but grammatically coherent sentences such as, "rooms in paris next month and dorms in Boston after Christmas". While this parser can handle complex structure, it cannot handle ungrammatical and out-of-model utterances such as, "in rooms paris next month and dorms boston christmas after".

In a second approach, the model M is used to build a Loose Parser, or a type-based slot filling parser. This parser can handle a large variety of sentences such as, "rooms in paris omg so excited!!!", but cannot handle complex grammatical structure such, "rooms in paris next month and dorms in boston after Christmas".

These two approaches to using the Model M have drawbacks that make them less than ideal. The first approach results in an accurate parsing, but only when the input structure fits the model grammar. The second approach results in a parse that is not as dependent upon fitting the model grammar, but fails when the structure becomes too complex. For example, a phrase such as, "yes please! love to travel! :D rooms in paris next month and dorms in boston after christmas omg!!!!" would fail in the first approach because it does not fit the model grammar, while it would also fail in the second approach due to the complexity of the grammatical structure.

While the model M is useful to build a parser for processing natural language queries, it would be helpful to have a different parser that combines the accuracy and complexity of the strict parser, while allowing a greater variety of sentences like the loose parser.

BRIEF SUMMARY

Systems and methods for parsing a natural language input are disclosed. In one aspect, a method for parsing a natural language includes receiving a natural language input, strictly parsing the natural language input to obtain an initial parse, the initial parse having at least one open slot, performing type based slot filling to fill the open slot, and outputting the final parse. In some embodiments, final parse is output to a search engine.

In some embodiments, the method further includes determining the completeness of the initial parse, comparing the completeness of the initial parse to a threshold, and performing type based slot filling in response to the initial parse not meeting the threshold.

In some embodiments, the initial parse outputs at least one text field. In some embodiments, multiple entities are eligible for a slot in the initial parse and the method further includes selecting a single entity to fill the slot. In some embodiments, the single entity is selected based on it being used the lowest number of time in the initial parse. In some embodiments, the single entity is selected based on it being closest to an expected position of the open slot.

In another aspect a system for parsing a natural language input includes a processor, an input/output interface, and memory storing computer executable instructions that when implemented by the processor cause the system to perform functions for parsing a natural language input. The functions include receiving a natural language input over the input/output interface, parsing the natural language input to obtain an initial parse, the initial parse having at least one open slot, performing type based slot filling to fill the open slot and obtain a final parse, and outputting the final parse over the input/output interface.

In some embodiments, the functions further include determining the completeness of the initial parse, comparing the completeness of the initial parse to a threshold, and performing type based slot filling in response to the initial parse not meeting the threshold.

In some embodiments, the initial parse outputs at least one text field. In some embodiments, multiple entities are eligible for a slot in the initial parse, and the functions further include selecting a single entity to fill the slot. In some embodiments, the single entity is selected based on it being used the lowest number of time in the initial parse. In some embodiments, the single entity is selected based on it being closest to an expected position of the open slot.

In some embodiments, the functions further include outputting the final parse to a search engine.

In another aspect, a method for building a query for a search engine includes receiving a text conversation, strictly parsing the text conversation to obtain an initial parse, the initial parse having at least one open slot, performing type based slot filling to fill the open slot, and outputting the final parse to a search engine.

In some embodiments, the method further includes determining the completeness of the initial parse, comparing the completeness of the initial parse to a threshold, and performing type based slot filling in response to the initial parse not meeting the threshold.

In some embodiments, the initial parse outputs at least one text field. In some embodiments, multiple entities are eligible for a slot in the initial parse and the method further includes selecting a single entity to fill the slot. In some embodiments, the single entity is selected based on it being used the lowest number of time in the initial parse. In some embodiments, the single entity is selected based on it being closest to an expected position of the open slot.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The claimed subject matter is related to natural language processing.

Illustrative Environment

Figure 1:
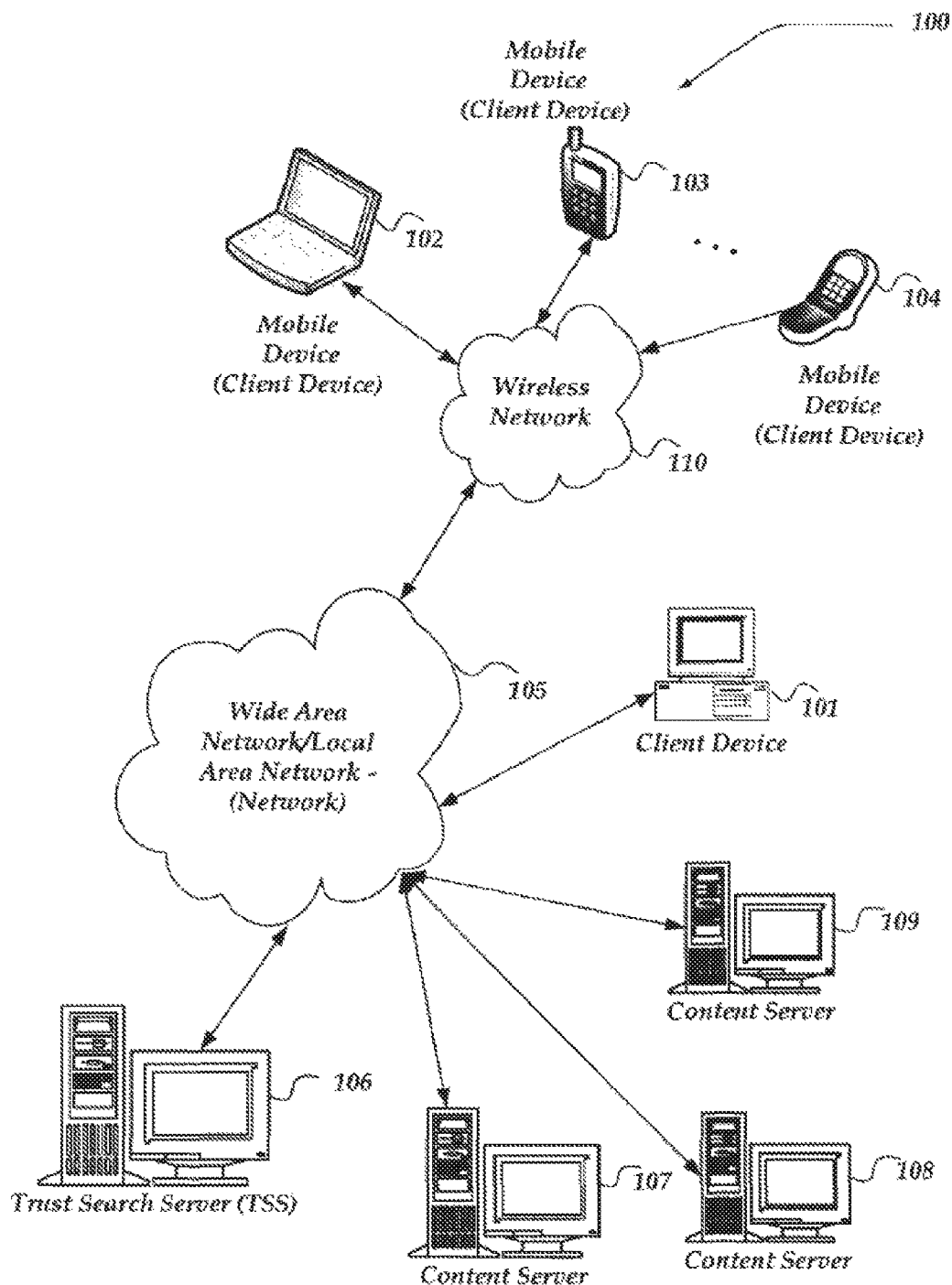
FIG. 1 illustrates a network

FIG. 1 is a schematic diagram illustrating an example embodiment of a network 100. Other embodiments that may vary, for example, in terms of arrangement or in terms of type of components, are also intended to be included within claimed subject matter. As shown, FIG. 1, for example, includes a variety of networks, such as local area network (LAN)/wide area network (WAN) 105 and wireless network 110, a variety of devices, such as client device 101, mobile devices 102, 103, and 104, and a variety of servers such as content servers 107, 108, and 109, and search server 106.

The network 100 may couple devices so that communications may be exchanged, such as between a client device, a search engine, and an ad server, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
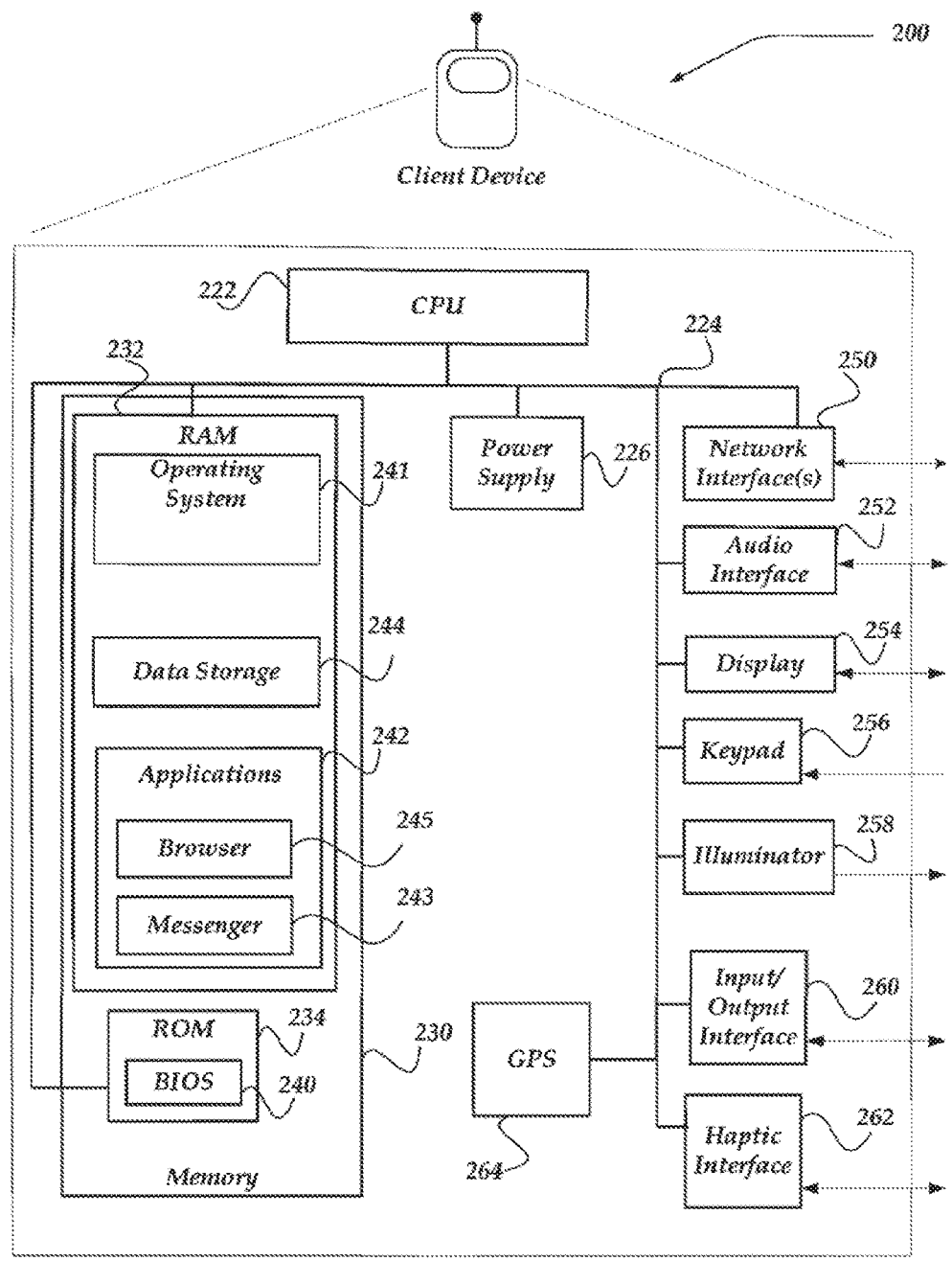
FIG. 2 illustrates a computing device.

FIG. 2 illustrates an example schematic of an embodiment of a computing device 200. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services, such as search services, indexing services, file services, email services, communication services, and content services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Terminology

In the following discussion, reference will be made to the term domain. Domain is defined as environment in which the natural language processing will take place. It may be application specific, specific to an organization, or a technical field. For example, the domain of an email application would include information related to sending and receiving email, addressing individuals and groups, scheduling, and so forth. In another example, a domain related to navigation might include information related to directions, addresses, geography, and distance. Other types of domains are possible and these examples are not meant to be inclusive.

In the following discussion, reference will be made to a model. A model may be domain specific and specifies the words and phrases in the domain and how those words and phrases map to sematic objects. One example of building a model is described in U.S. Pat. No. 8,818,795 which is hereby incorporated by reference. As a running example, consider a travel domain and assume that a parser is needed to search for rooms and dorms. Generally, rooms and dorms can be located in some place. The parser need to understand phrases such as "rooms in paris", "dorms in boston", "dorms in paris and rooms in boston". The output of the parse should be multi-sorted, first-order formulae. The model for this problem could be as follows:

```
{
    Ontology:
    {
        {
        Name: Room
        Subcategories: []
        }
        {
        Name: Dorm
        Subcategories: []
        }
        {
        Name: Locatable
        Subcategories: [Room, Dorm]
        }
    }
    Grammar:
    {
        {
            Name: Room
            Pattern: ["room"]
```

```
            }
        {
            Name: Dorm
            Pattern: ["dorm"]
        }
    }
}
```

In this example of a model, Room and Dorm are being declared as categories with no subcategories, and a default category Locatable has subcategories Room and Dorm. Default categories are categories that are already predefined in the system. They can be used out-of-the-box by the model developer. They are similar in nature to functions and methods available in the standard library of many programming languages. The text patterns "room" and "dorm" are then associated with the categories Room and Dorm as a part of the grammar.

In the following discussion, reference will be made to the term grammar. Grammar is the rules by which a language is defined. The grammar contains a lexicon, grammatical structures, and semantic output for each lexical item, as well as each potential grammatical relation. A lexicon is information about words of a language and what categories they belong to. The lexicon may contain further information, such as the type of verb or noun. Grammatical structures describe the rules of the language that relate the form of phrases and sentences. The semantic output describes a meaning for each lexical item. The grammar may vary by domain. For instance, in the domain of email, forward is a verb, i.e. to forward an email, whereas in navigation, forward is a noun, i.e. move forward. The following is an example of the previously described model translated into a grammar.

```
Syntax
    S [main: x1] => n 1
    NP [type: Location, ref: x1 ] n 2
    NP [type: Room, ref: x2 modifier: [n 1 ]]
    S [main: x2] => n 1
    NP [type: Location, ref: x1 ] n 2
    NP [type: Dorm, ref: x2, modifier: [n 1 ]]
    NP [num: singular, type: Room, ref: x1, modifier: [x2]] => "room"
    NP [num: plural, type: Room, ref: x1, modifier: [x2]] => "rooms"
    NP [num: singular, type: Dorm, ref: x1, modifier: [x2]] => "dorm"
    NP [num: plural, type: Dorm, ref: x1, modifier: [x2]] => "dorms"
    NP [type: Location, ref: x1 ] => "paris"
    NP [type: Location, ref: x1 ] => "boston"
    Conjunction [left: x1, right:x2] => "and"
    S => n 1
    S [main: x1] Conjunction [left: x1, right:x2] n 2
    S [main: x2]
Semantics
NP [type: Room ref: x ] => { Class : Room Object: x::Room}
NP [type: Room, ref: x, modifier: [y:[type:Location]]] => { Location: y::Location , Object : x::Room}
Conjunction [left: x1, right:x2] => { Constraint: All, Choices : [x1, x2]}
In the semantic rules just above, the variables have the following types:
    x has type Room
    y has type Location
```

The objects on the right side of the semantic rules are called atom templates. Each word or construction in the input is assigned a unique abstract identifier termed as the referent. The utterance "paris rooms" would result in the following semantics (termed atoms or semantic atoms) if the referent for "paris" is x1 and the referent for "rooms" is x2:

{ Class : Location, Object : x1}
{ Class : Room, Object : x2}
{ Location : x1, Object : x2}

In the following discussion, reference will be made to parsing. Parsing is the conversion of a natural language into a structured format called a parse. The natural language may be grammatically correct sentences, or in more complicated systems the natural language may comprise partial sentences, phrases, or utterances. This natural language may be parsed into a parse for processing by a computer. Two forms of parsing include loose, or ungrammatical parsing, and strict, or grammatical parsing.

A strict parser uses the all of the above unification grammar to arrive at the semantics. This means that the strict parser cannot go beyond what is specified by the given grammar. It cannot for example handle "omg! paris rooms please!" The loose parser uses the grammar to build typed entity extractors. Using typed extractions from the input, and the types in the atom templates, the loose parser generates filled semantic atoms. It can easily handle sentences such as "omg! paris rooms please!". While the loose parser has wide coverage, it cannot handle complex structure such as "paris rooms and boston dorms". For example, it would generate the following semantics for this phrase:

Referents :
    "paris" => x1
    "rooms" => x2
    "boston" => x3
    "dorms" => x4
{ Class : Location, Object : x1}
{ Class : Location, Object : x3}
{ Class : Room, Object : x2}
{ Location : x1, Object : x2}

-continued

{ Class : Dorm, Object : x4}
{ Location : x3, Object : x4}
{ Class : Room, Object : x2}
{ Location : x3, Object : x2}

{ Class : Dorm, Object : x4}
{ Location : x1, Object : x4}

In the following discussion, reference will be made to TextFields. If an entity is declared as a TextField, then any collection of words may be used for that entity. For example, if Location were declared as a textfield, then the following sentence could be under stood (with the detected locations in bold) without maintaining a list or database of possible locations or any other special module for detecting locations:
rooms in paris
rooms near levi's stadium
show me rooms around yahoo's headquarters
dorms that are around my aunt's place next to levi's stadium near yahoo

TextFields can be used whenever arbitrary text needs to be understood without maintaining a huge list of possibilities. For example, they can be used for:
names of people: "emails from Sam Smith,"
names of things: "stock price for International Corporation,"
time descriptions: "schedule a meeting on the first monday after my son's game",
project ids: "show all downloads for racer game version 2 phone" etc.

In traditional parsing, TextFields are detected only in grammatical sentences. The present embodiments allow the benefits of TextFields with loose parsing and allows for detecting TextFields in ungrammatical sentences.

Overview

Embodiments include a system and a method for natural language processing. The system may be implemented as software modules executing on a computing device as shown in FIG. 2. In some embodiments, different modules may execute on separate computing devices, or in other embodiments they may be executed on the same computing device. As a general concept, the system and method provides for a novel combination of a strict parsing and a loose parsing using a common model.

Hybrid Parsing Method

Figure 3:
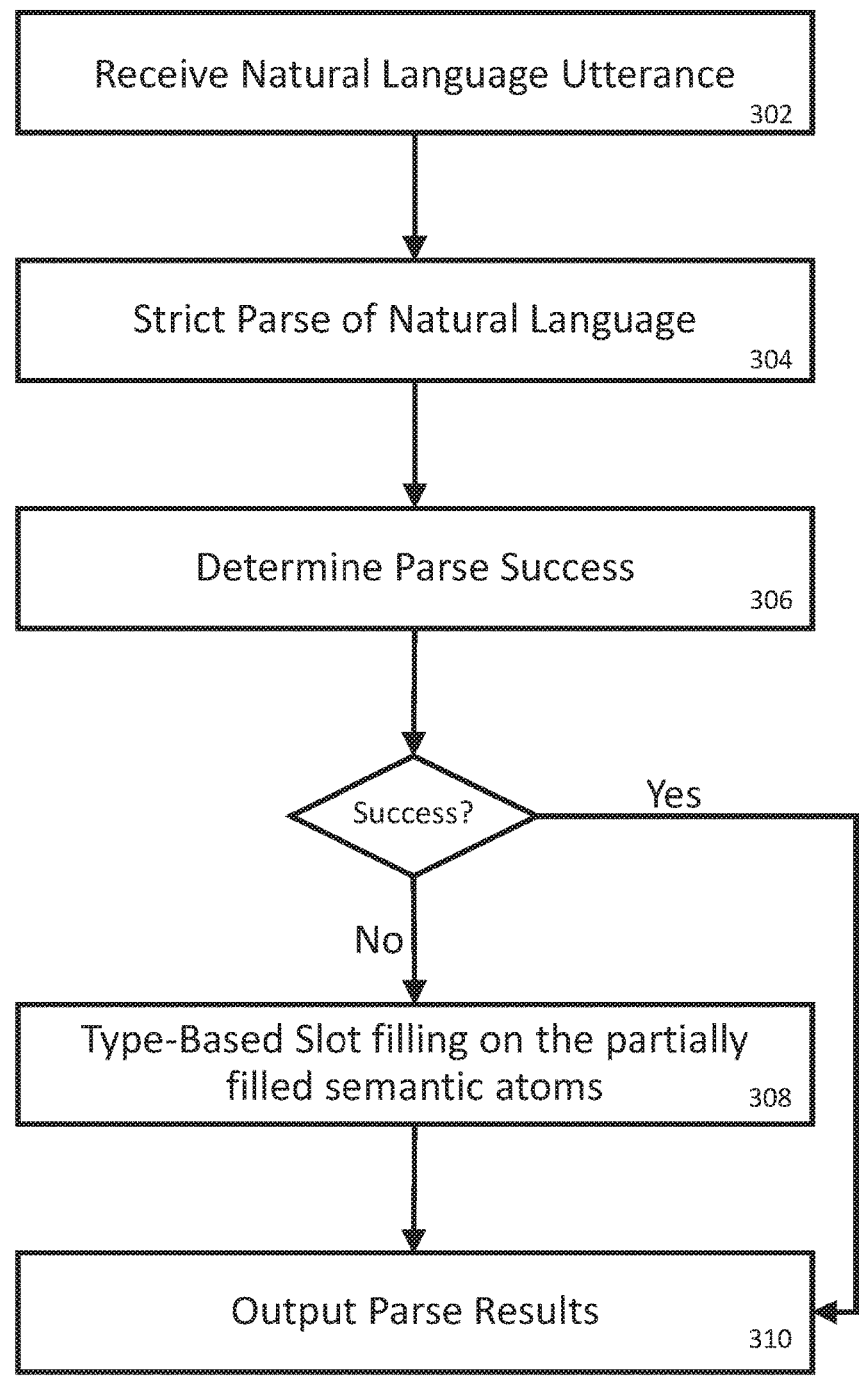
FIG. 3 illustrates a method for hybrid parsing.
Figure 4:
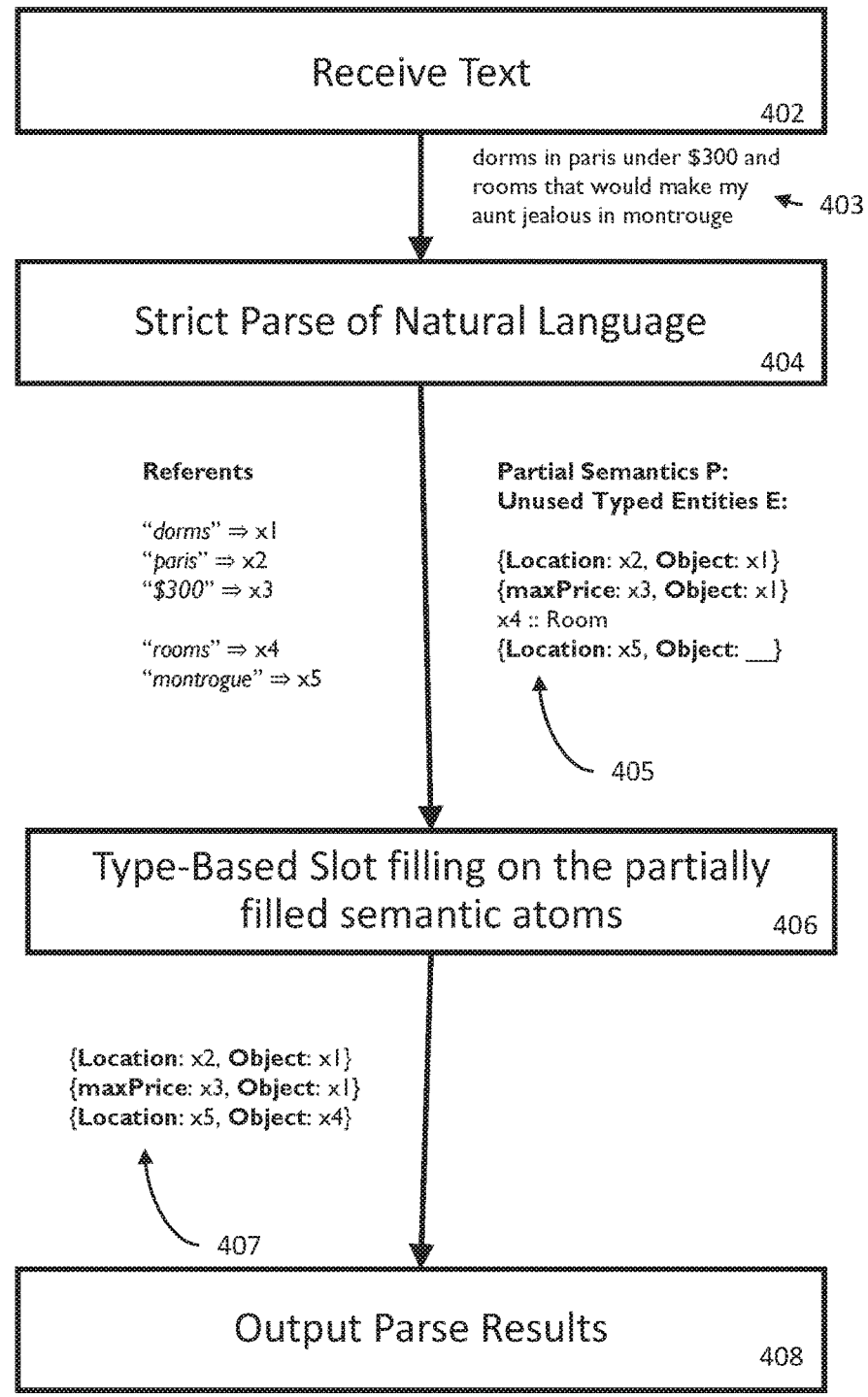
FIG. 4 illustrates the method of FIG. 3 as applied to an example natural language phrase.

FIG. 3 illustrates a flow chart 300 of a method for hybrid parsing using a combination of strict parsing with loose parsing. The method begins at block 302, in which a computing device 200 receives a natural language utterance. The computing device 200 may receive the natural language utterance remotely, such as over a network 105 by way of a network interface 250, or the utterance may be received locally, such as through a local text input by way of keypad 256, verbal input by way of audio interface 252, or other input by way of input/output interface 260. The natural language utterance may be a deliberate input into the computer system 200 for further processing, such as a command to search or perform an action. In other examples, the natural language utterance may be an ongoing discussion or conversation that is not a deliberate input. For example, the natural language utterance could be text from a text message to another user, or a part of a conversation. In the running example of the search for rooms and dorms, the natural language utterance could be a conversation discussing an upcoming vacation.

In block 304, the natural language utterance is parsed using a strict parsing. For example, computing device 200 may contain an application 242 in memory 230 for parsing the natural language utterance. The output from the strict parsing is a parse of partially filled sematic atoms and a set of entities (such as locations, names, or other custom entities), depending on the whether the input is grammatical. The more grammatical the input, the more completely filled the semantic atoms will be.

In block 306, the resulting parse is analyzed to determine if the initial parse was successful. One technique for determining if a parse was successful is to calculate the fraction of the input sentence that was successfully parsed. For example, how many unused entities exist after parsing. If the fraction of the input sentence that was parsed exceeds a set threshold, then the sentence is considered to be good input and no further processing is needed. The method jumps ahead to block 310 and the parse from the strict parser is output to a computing system 200. The computing system need not be the same as the computing system parsing the natural language utterance. In some embodiments, the output is transferred to a separate computing system, such as a search engine.

If the parse is determined to be unsuccessful then the method continues to block 308, in which the output of the strict parsing is further processed to fill the empty slots of the output. The empty slots are filled using type based slot filling to complete the parse as will be discussed below with relation to the running example.

The resulted parse, supplemented with the type based slot filling is then output at block 310 for further processing. For example, the parse could be input into a search engine to find search results related to the natural language or it could be used to identify marketing opportunities by an advertiser.

The following is an example of the method 300 parsing the utterance, "yes please! paris OMG rooms and boston dorms!" Such an utterance could be a part of an ongoing conversation about upcoming travel plans. The utterance is input to parser which performs a strict parse that, depending on the Model and grammar may result in the following semantic atoms and entities:

Referents:
 "paris" => x1
 "rooms" => x2
 "boston" => x3
 "dorms" => x4
Partial Semantics P:
 { Class : Room, Object : x2}
 { Location : \_\_\_, Object : x2}
 { Class : Dorm, Object : x4}
 { Location : x3, Object : x4}
Unused Typed Entities E:
 x1 :: Location Because the phrase does not follow a customary pattern and contains irregular text, the strict parser is unable to identify what location is associated with object x2. In other words, the input is not grammatical in that it does not properly follow a set rule. The previously described grammar has a syntax that is looking for either Location followed by Room or Dorm, or for Location separated from Room or Dorm by And. The phrase "paris OMG rooms" does not match any of these syntactical rules and therefore x1 is unused. Referent x2 is readily matched belongs in the Class of Room, and the syntactical rules indicate that the text "room" should have an associated location. Similarly, the parse recognizes that the text "dorms" belongs to the Class of Dorm, and is further able to associate the text "dorms" with the location of Boston, based on the phrase matching the strict grammar of the parser. Thus, the parse is nearly complete, with the exception of the empty slot for a location associated with object x2.

The unused typed entities indicate that the text "paris" is of the type location, but was not used in the parse. Because the type location matches the open slot, it is assumed that the location of paris is the missing location in the parse. The parse is then updated using "paris" as the missing location as shown in the following parse:

```
{ Class : Room, Object : x2}
{ Location : x1, Object : x2}
{ Class : Dorm, Object : x4}
{ Location : x3, Object : x4}
```

In contrast, a loose parser processing the same input would result in the following parse:

```
Referents
    "paris"⇒ x1
    "rooms"⇒ x2
    "boston"⇒ x3
    "dorms"⇒ x4
Partial Semantics
    {Location: ___, Object: x2
    {Location: x3, Object: x4}
Available Untyped Entities
    x1
    x2
    x3
    x4
```

Without the use of the semantic types to fill the location slot, any of the untyped entities may be used to fill the slot. Thus the loose parser would result in the following four possible parses.

```
{Location: x1, Object: x2}
{Location: x3, Object: x4}
{Location: x2, Object: x2}
{Location: x3, Object: x4}
{Location: x3, Object: x2}
{Location: x3, Object: x4}
{Location: x4, Object: x2}
{Location: x3, Object: x4}
```

Despite having four possible outputs, only one correctly captures the semantics of the phrase.

EXAMPLE

The following is an example of a hybrid natural language search engine. This particular search engine searches for vacation properties with the following parameters:

lower and upper price limits;
locations; and
type of accommodation: room, dorm, etc.
This is a simplified example; the system may be expanded to include many additional parameters.

In this example, a user is traveling to Paris and wants to stay either in a proper room in Montrouge, a neighboring cheaper city, or a dorm in Paris. Additionally, the user desires to send photos of their room to their relatives and make them jealous. The system does not support this parameter, although the user may not be aware of this.

In block 402 an example query 403 by a user might be: "dorms in paris under $300 and rooms that would make my aunt jealous in montrouge"

An example grammar is as follows:

```
1. NP[semanticType:Room] —> "rooms"
2. NP[semanticType:Dorm] —> "dorms"
//The following two rules handle queries of the form "rooms in paris"
3. NP[semanticType:Room] —> NP[semanticType:Room] "in" NP[semanticType:Location]
4. NP[semanticType:Dorm] —> NP[semanticType:Dorm] "in" NP[semanticType:Location]
//The following two rules handle queries of the form "rooms in paris"
5. NP[semanticType:Room] —> NP[semanticType:Room] "under" NP[semanticType:Price]
6. NP[semanticType:Dorm] —> NP[semanticType:Dorm] "under" NP[semanticType:Price]
//The following two rules handle queries of the form "rooms and dorms"
7. NP[semanticType:Accommodation] –> NP[semanticType:Dorm] "and" NP[semanticType:Room]
//many other rules not shown.
```

The query is processed according to this grammar in a strict parser. Because the grammar is limited, it is only able to process the part of the query shown in bold below: "dorms in paris under $300 and rooms that would make my aunt jealous in montrouge"

The initial output 405 from the strict parser follows:

| Referents | Partial Semantics P: | Unused Typed Entities E: |
|---|---|---|
| "dorms"⇒ x1 | | |
| "paris"⇒ x2 | {Location: x2, Object: x1} | |
| "$300"⇒ x3 | {maxPrice: x3, Object: x1} | x4 :: Room |
| "rooms"⇒ x4 | {Location: x5, Object: ___} | |
| "montrogue"⇒ x5 | | |

The system then uses type based slot filling at block 406 to fill the missing slot. The resulting full parse 407 is

```
{Location: x2, Object: x1}
{maxPrice: x3, Object: x1}
{Location: x5, Object: x4}
```

This resulting parse may then be output for use by another system.

Disambiguation

In some instances, there may be multiple unused typed entities available for slot filling, i.e. {e1, e2, . . . , en} of semantic type T that can go into a slot S of type T. Ideally, the slot is filled with only one entity of the unused entities. There are heuristics that may be helpful in selecting one single entity in such cases.

The first heuristic is to use the least used entity for slot filling. In this heuristic the entity that used the loser number of time in the initial output from the strict parser is used. For example, if an entity is used in numerous places in a parse, it is likely that it does not match to an unfilled slot. Thus, it may be more accurate to use an entity that did not fit with the existing parse.

The second heuristic is to use distance for slot filling. For each slot that is unfilled, the strict parser can compute an expected position for the slot in the input. Thus, it is assumed that the unused entity closest to the slot is the entity that should be in the slot. For example, the strict parser could determine that a slot for a Location is expected to occur before a room type. Thus the parser would select the unused entity closest to the word that comes before the room type.

The invention claimed is:

1. A method of parsing a natural language input, comprising:
receiving a natural language input;
strictly parsing the natural language input to obtain an initial parse, the initial parse having at least one open slot;
performing type based slot filling to fill a first open slot of the at least one open slot and obtain a final parse, wherein multiple entities are eligible for the first open slot, and performing the type based slot filling comprises:
selecting a single entity to fill the first open slot, wherein the single entity is selected based upon at least one of:
the single entity being used a lowest number of times in the initial parse, or
the single entity being closest to an expected position of the first open slot; and
outputting the final parse comprising at least one of:
outputting the final parse over an input/output interface, or
outputting the final parse to a search engine.

2. The method of claim 1, further comprising:
determining a completeness of the initial parse; and
comparing the completeness of the initial parse to a threshold,
wherein performing type based slot filling comprises performing the type based slot filling in response to the initial parse not meeting the threshold.

3. The method of claim 1, wherein the initial parse outputs at least one text field.

4. The method of claim 1, wherein the final parse comprises the initial parse with the single entity being filled in the first open slot.

5. The method of claim 1, wherein the single entity is selected based on the single entity being used the lowest number of time in the initial parse.

6. The method of claim 1, wherein the single entity is selected based on the single entity being closest to the expected position of the first open slot.

7. The method of claim 1, wherein outputting the final parse comprises outputting the final parse to the search engine.

8. A system for parsing a natural language input, comprising:
a processor;
an input/output interface; and
memory storing computer executable instructions that when implemented by the processor cause the system to perform functions comprising:
receiving a natural language input over the input/output interface;
parsing the natural language input to obtain an initial parse, the initial parse having at least one open slot;
performing type based slot filling to fill a first open slot of the at least one open slot and obtain a final parse, wherein multiple entities are eligible for the first open slot, and performing the type based slot filling comprises:
selecting a single entity to fill the first open slot, wherein the single entity is selected based upon at least one of:
the single entity being used a lowest number of times in the initial parse, or
the single entity being closest to an expected position of first the open slot; and
outputting the final parse over the input/output interface.

9. The system of claim 8, wherein the functions further comprise:
determining a completeness of the initial parse; and
comparing the completeness of the initial parse to a threshold,
wherein performing type based slot filling comprises performing the type based slot filling in response to the initial parse not meeting the threshold.

10. The system of claim 8, wherein the initial parse outputs at least one text field.

11. The system of claim 8, wherein the final parse comprises the initial parse with the single entity being filled in the first open slot.

12. The system of claim 8, wherein the single entity is selected based on the single entity being used the lowest number of time in the initial parse.

13. The system of claim 8, wherein the single entity is selected based on the single entity being closest to the expected position of the open slot.

14. The system of claim 8, wherein outputting the final parse comprises outputting the final parse to a search engine.

15. A method for building a query for a search engine, comprising:
receiving a text conversation;
strictly parsing the text conversation to obtain an initial parse, the initial parse having at least one open slot;
performing type based slot filling to fill a first open slot of the at least one open slot and obtain a final parse, wherein multiple entities are eligible for the first open slot, and performing the type based slot filling comprises:
selecting a single entity to fill the first open slot, wherein the single entity is selected based upon at least one of:
the single entity being used a lowest number of times in the initial parse, or
the single entity being closest to an expected position of the first open slot; and
outputting the final parse to a search engine.

16. The method of claim 15, further comprising:
determining a completeness of the initial parse; and
comparing the completeness of the initial parse to a threshold,
wherein performing type based slot filling comprises performing the type based slot filling in response to the initial parse not meeting the threshold.

17. The method of claim 15, wherein the initial parse outputs at least one text field.

18. The method of claim 15, wherein the final parse comprises the initial parse with the single entity being filled in the first open slot.

19. The method of claim 15, wherein the single entity is selected based on the single entity being used the lowest number of time in the initial parse.

20. The method of claim 15, wherein the single entity is selected based on the single entity being closest to the expected position of the first open slot.

* * * * *